UNITED STATES PATENT OFFICE.

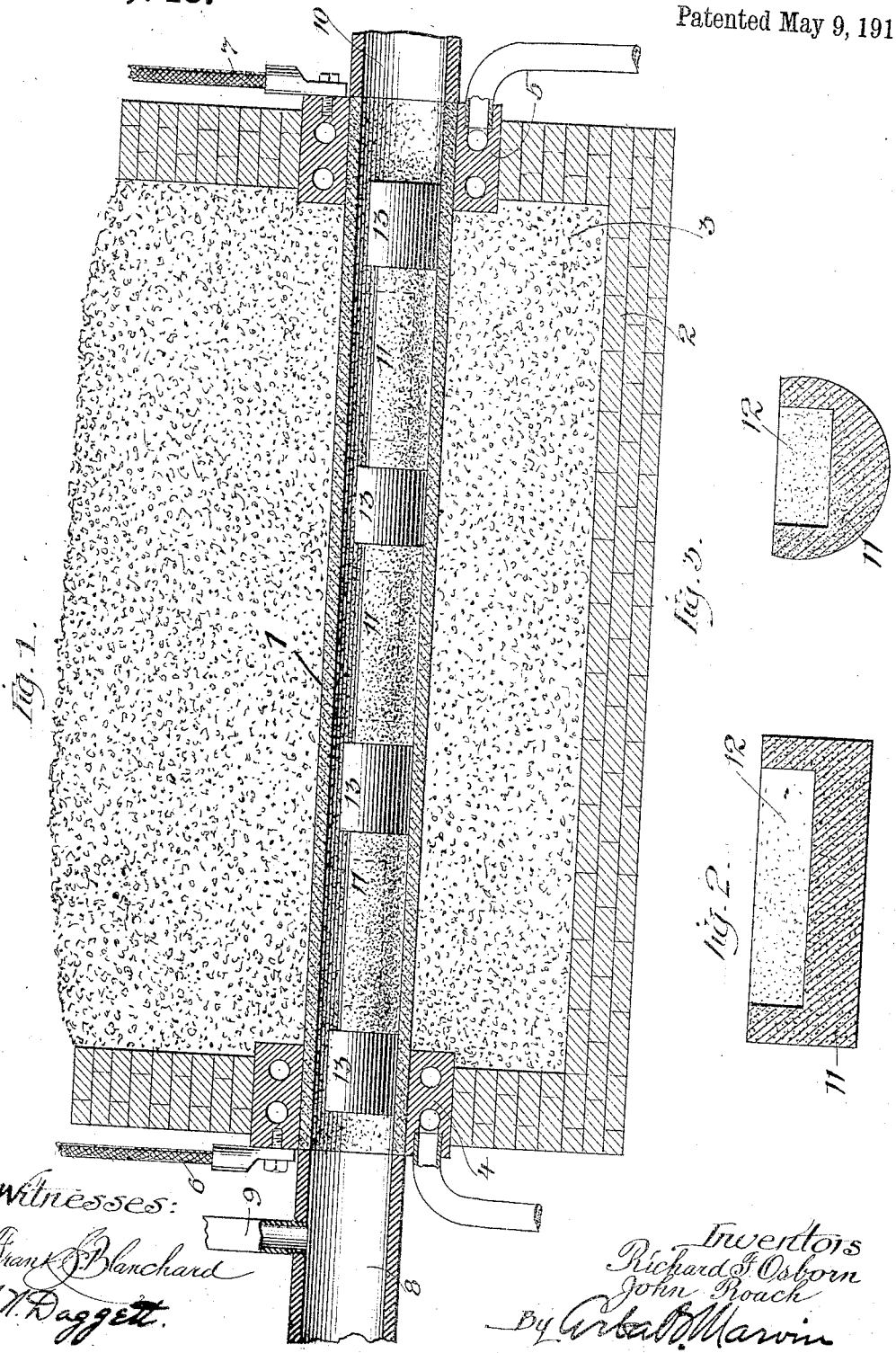

RICHARD F. OSBORN AND JOHN ROACH, OF AINSWORTH, NEBRASKA, ASSIGNORS OF ONE-THIRD TO ALBERT A. RADTKE, OF CHICAGO, ILLINOIS.

METHOD OF MAKING ARTIFICIAL STONEWARE.

991,743.      Specification of Letters Patent.      Patented May 9, 1911.

Application filed May 7, 1910. Serial No. 559,943.

*To all whom it may concern:*

Be it known that we, RICHARD F. OSBORN and JOHN ROACH, citizens of the United States, both residing at Ainsworth, county of Brown, State of Nebraska, have invented certain new and useful Improvements in Methods of Making Artificial Stoneware, of which the following is a specification.

In Brown county, Nebraska, and in other places, there may be found large deposits of a dry, gritty sand, having a chemical composition approximately as follows: silica 93.74%, oxids of iron 2.13%, oxid of aluminum 1.3%, calcium oxid .56%, sulfate of lime, trace, magnesium oxid 1.03%, combined moisture .72%, undetermined .52%.

The main object of the present invention is to produce from this sand, and from sands of a similar composition, an artificial stoneware, very porous in its structure, but strong and coherent.

The material produced as herein described is very refractory in character, and has low heat conductivity, and may be used for building purposes, as in the form of brick, building blocks, roofing material and the like, or it can be made in the shape of drainage tile and filter blocks, wherein its great porosity is of advantage in allowing the ready passage of water.

In the process herein described and claimed, the sand is made into coherent bodies without the use of moisture or the aid of pressure, and without the addition of any binding agent or any fluxing medium.

An apparatus wherein the process may be effected is shown in the accompanying drawings, in which—

Figure 1 is a sectional elevation of an electrical furnace of the resistance tube type. In this furnace, the necessary heat treatment of the sand may be carried out. Fig. 2 is a longitudinal section of a mold in which the sand may be supported during its passage through the furnace. Fig. 3 is a transverse section of the mold shown in Fig. 2.

The furnace shown in the drawing comprises a carbon resistance tube 1, mounted in a brickwork 2, and covered by a refractory packing 3 of magnesia or other heat insulating material. The carbon tube is provided at its ends with water-cooled copper terminals 4 and 5, of ordinary type, to which current of suitable quantity and voltage may be delivered through conductors 6 and 7. At the inlet end of the resistance tube is an iron chamber 8, serving to exclude air from the tube, and affording a means for conveying the objects to be heated into the carbon tube. This chamber 8 may have a tubular inlet 9, through which an inert gas may be supplied to the carbon tube to lessen the danger of chemical action therein. At the other end of the carbon tube is an iron chamber 10, into which the heated objects may be expelled after their heat treatment has been completed. Through this heated carbon tube may be passed a series of refractory boats or molds containing sand to be subjected to the sintering action of the heat maintained by the tube. The exact shape of these molds will depend on the shape of the product to be produced, but for producing rectangular bricks, the molds may be of the kind shown in Figs. 2 and 3. These molds are of carbon with a rounded bottom to fit the general contour of the heating tube, and with a rectangular recess 12, open at the top, and serving as a receptacle for the dry sand. Spacing blocks 13 of lavite or other inert refractory material, may be used to separate one carbon mold from another.

The operation of the apparatus is as follows: Dry sand, of about the composition above indicated, is introduced into the carbon molds, and these molds are pushed into the furnace, one after another, with insulating blocks between, and are there subjected to a heat high enough to sinter the particles of sand into a coherent body having the general shape of the mold. The temperature should not, however, be sufficient to fuse the sand, or to cause any appreciable flow throughout the major portion of the material. If, however, it be desired that one of the faces of the brick or object should have a water-proof or glazed surface, the process may be modified by running the furnace temperature somewhat higher, and allowing the exposed surface of the sand to heat to such a temperature that it will glaze over by fusion. The protection afforded by the graphite mold prevents fusion of the sand below the surface layer, thus insuring for the fused layer a strong porous backing of sintered material. The molds, with their contents, are ultimately pushed through into the outlet chamber 10, from which they may be removed.

The electric tube furnace, when used as a heating means, offers the advantage that the temperature can be closely regulated, and the further advantage that the heating of the sand and its mold goes on in an inert environment, thereby obviating the danger of oxidizing the molds.

Artificial stoneware produced as herein described is about like firebrick in its power to resist eat, but is much more porous than firebrick. Because of this porosity, it has a much lower heat conductivity. Also, its porous structure gives to it a certain toughness and power to resist shock and localized pressure. Under a magnifying glass, this artificial stoneware seems to consist of the original sand particles merely joined together at their points of contact, leaving the original interstices altogether open. It is this highly porous character of the material which renders it serviceable for use as filter blocks, and as drainage tile and the like. The self-glazing characteristic of the material renders it available for use where moisture must be excluded.

In a divisional application filed July 1, 1910, Serial No. 569,932, claims are made on the product herein disclosed.

What we claim as new, and desire to secure by Letters Patent of the United States is:

1. The method of making porous stoneware, which consists in progressively passing loose dry sand, composed largely of silica, through a heated zone, the temperature of which is regulated to cause the greater part of said sand to sinter into a coherent but highly porous body.

2. The method of making porous stoneware solely from coarse dry sand containing about 93% silica, which consists in holding the sand particles in loose contact with one another and then slowly passing the sand through a heated zone and there subjecting it to a heat regulated in time and intensity to sinter the sand particles to one another at their points of contact.

3. The method of forming porous stoneware solely from dry sand composed largely of silica which consists in supporting the sand in a loose condition in a predetermined shape and then subjecting it to a heat regulated in time and intensity to produce fusion of the sand at an exposed outer surface thereof, and to sinter the sand particles at places remote from that surface into a coherent but porous body.

4. The method of making porous stoneware solely from coarse dry sand in a loose condition, which consists in suitably supporting the sand and passing said sand while thus supported through a heated zone, the temperature of said zone being regulated to cause the greater part of said sand to sinter into a coherent porous body during its movement through said heated zone.

5. The method of making porous stoneware solely from coarse dry sand, which consists in loosely supporting the sand in a predetermined shape and slowly and progressively passing said loose sand, while thus supported, through a heating chamber maintained at a temperature sufficient to sinter said sand into a coherent but porous body during its transit therethrough.

6. The method of making porous stoneware solely from coarse dry sand composed largely of silica, which consists in supporting the sand in suitable manner and passing it, while thus supported, through a heating chamber maintained at a temperature sufficient to sinter said sand into a coherent but porous body during its transit therethrough.

In witness whereof, we have hereunto set our signatures this 4th day of May, A. D. 1910.

RICHARD F. OSBORN.
JOHN ROACH.

Witnesses:
 DAISY M. EAGER,
 ARBA B. MARVIN.